United States Patent
Konik et al.

(10) Patent No.: US 10,437,852 B2
(45) Date of Patent: *Oct. 8, 2019

(54) AGGREGATING MODIFICATIONS TO A DATABASE FOR JOURNAL REPLAY

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Otsego, MN (US); Chad A. Olstad, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 456 days.

This patent is subject to a terminal disclaimer.

(21) Appl. No.: 14/796,080

(22) Filed: Jul. 10, 2015

(65) Prior Publication Data

US 2016/0364405 A1 Dec. 15, 2016

Related U.S. Application Data

(63) Continuation of application No. 14/738,070, filed on Jun. 12, 2015.

(51) Int. Cl.
*G06F 16/27* (2019.01)
*G06F 16/23* (2019.01)

(52) U.S. Cl.
CPC ........ *G06F 16/273* (2019.01); *G06F 16/2358* (2019.01)

(58) Field of Classification Search
CPC ......... G06F 17/30368; G06F 17/30489; G06F 17/30578; G06F 16/273; G06F 16/2358

USPC .................................................. 707/802, 803
See application file for complete search history.

(56) References Cited

U.S. PATENT DOCUMENTS

| | | | | |
|---|---|---|---|---|
| 6,151,602 A | * | 11/2000 | Hejlsberg | ................ H04L 67/06 707/E17.005 |
| 8,090,700 B2 | * | 1/2012 | Horii | ................ G06F 16/24534 707/705 |
| 8,296,271 B1 | | 10/2012 | Richardson et al. | |
| 8,570,944 B2 | * | 10/2013 | Bhalla | ................ H04W 24/02 370/328 |
| 8,700,574 B2 | | 4/2014 | Thomson et al. | |
| 8,745,105 B2 | | 6/2014 | Erofeev | |
| 8,818,939 B2 | | 8/2014 | Tarbell | |
| 2004/0193655 A1 | * | 9/2004 | Miyata | ................ G06F 16/27 707/E17.005 |

(Continued)

OTHER PUBLICATIONS

Mongodb, "Manage Journaling", Tutorial, MongoDB Documentation Manual 3.0.3, Chapter 5, Section 5.2.1, pp. 231-233, May 2015, MongoDB, Inc., New York, NY.

(Continued)

*Primary Examiner* — Phong H Nguyen
(74) *Attorney, Agent, or Firm* — David M. Quinn

(57) ABSTRACT

Aggregating database entry modifications for replay of database changes includes: inserting, in a journal modification table, of database entry modifications, where each database entry is associated with a relative record number; and, for each relative record number: aggregating, in the journal modification table, a plurality of the modifications into a single modification.

6 Claims, 5 Drawing Sheets

(56) References Cited

U.S. PATENT DOCUMENTS

| | | | | |
|---|---|---|---|---|
| 2004/0199548 A1* | 10/2004 | Miller | ............... | G06F 16/273 |
| | | | | 707/E17.005 |
| 2004/0243591 A1* | 12/2004 | Gu | ............... | G06F 16/283 |
| | | | | 707/E17.005 |
| 2006/0095405 A1* | 5/2006 | Anderson | ............... | G06F 16/22 |
| | | | | 707/999.003 |
| 2007/0239797 A1* | 10/2007 | Cattell | ............... | G06F 16/217 |
| | | | | 707/E17.005 |
| 2009/0216809 A1* | 8/2009 | Horii | ............... | G06F 16/24534 |
| | | | | 707/E17.005 |
| 2011/0080870 A1* | 4/2011 | Bhalla | ............... | H04W 24/02 |
| | | | | 370/328 |
| 2013/0132335 A1* | 5/2013 | Yang | ............... | G06F 16/23 |
| | | | | 707/609 |
| 2014/0337562 A1 | 11/2014 | Long et al. | | |

OTHER PUBLICATIONS

Sqlite, "SQLite's Use of Temporary Disk Files", sqlite.org (online), accessed May 18, 2015, 7 pages, URL: www.sqlite.org/tempfiles.html.

Google, "Database Journal Rollback Optimization", Search Results, google.com (online), accessed May 18, 2015, 2 pages, URL: www.google.com/?tbm=pts&gws_rd=ssl#tbm=pts&q=database+journal+rollback+optimization.

Appendix P; List of IBM Patent or Applications Treated as Related, May 15, 2019, 2 pages.

* cited by examiner

AGGREGATING MODIFICATIONS TO A DATABASE FOR JOURNAL REPLAY

CROSS-REFERENCE TO RELATED APPLICATION

This application is a continuation application of and claims priority from U.S. patent application Ser. No. 14/738,070, filed on Jun. 12, 2015.

BACKGROUND OF THE INVENTION

Field of the Invention

The field of the invention is data processing, or, more specifically, methods, apparatus, and products for aggregating database entry modifications for replay of database changes.

Description of Related Art

Current databases may include many entries which may be modified many times by various applications. To provide redundancy in case of file corruption in the database and to provide a means by which undesired modifications may be removed, current database systems may employ journaling. 'Journaling' refers to real-time (or near real time) logging of data-file updates or modifications to database files. A journal is a data structure that stores each of the modifications tracked during journaling. Generally, such tracking is carried out from a start to an end point. Such start points may be a user specified point in time, an occurrence of a user specified action, a commit or transaction boundary, or at an object save point such as the creation of an object in a database. An end point for tracking database operations may be a user specified point in time, a user specified timestamp, a user specified sequence number, an end of a journal (wherein the journal reaches a maximum number of changes or a maximum size), an end to present changes, a commit or transaction boundary, and so on as will occur to readers of skill in the art. Journal replay refers to the use of the journal to reapply or remove, to the database, the modifications tracked in the journal. For example, a journal may be used to restore a database upon file corruption of one or more tables in the database by reapplying all modification tracked in the journal from the start to the end point. Alternatively, the journal may be used to roll-back a database, modification by modification, to remove one or more undesired changes to the database.

Due to the fact that journals are configured to store every single modification made between the start and endpoints, journals may become quite large in size. Further, to apply or remove each of these modifications during a journal replay may require a very large amount of processing power and a significant amount of time.

SUMMARY OF THE INVENTION

Methods, apparatus, and products for aggregating database entry modifications for replay of database changes are described in this specification. Such aggregation includes: inserting, in a journal modification table, a plurality of database entry modifications, each database entry associated with a relative record number; and, for each relative record number: aggregating, in the journal modification table, a plurality of the modifications into a single modification.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
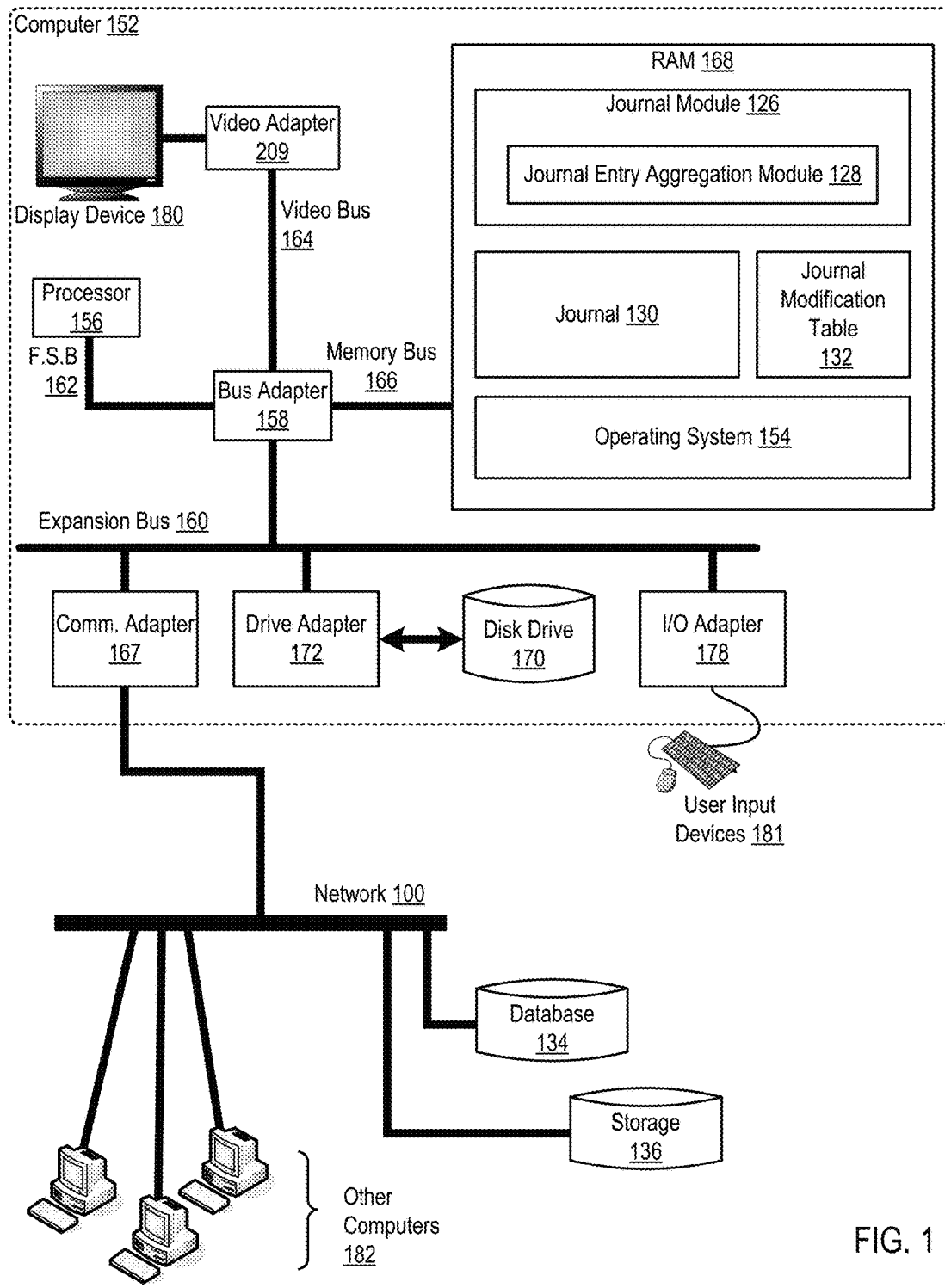
FIG. 1 sets forth a network diagram of a system for aggregating database entry modifications for replay of database changes according to embodiments of the present invention.

Exemplary methods, apparatus, and products for aggregating database entry modifications for replay of database changes in accordance with embodiments of the present invention are described with reference to the accompanying drawings, beginning with FIG. 1. FIG. 1 sets forth a network diagram of a system for aggregating database entry modifications for replay of database changes according to embodiments of the present invention. The system of FIG. 1 includes automated computing machinery in the form of an example computer (152). The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a journal module (126), a module of computer program instructions that, when executed, causes the computer (152) to aggregating database entry modifications for replay of database changes in accordance with embodiments of the present invention. The journal module (126) may be configured, generally, to carry out journaling of modifications made to the database (134) from a start point to an end point. That is, the journal module (126) may track each modification made to the database (134) between a start and end point and store each of those modifications in the journal (130).

The journal module (126) may also be configured with a component, referred to here as the journal entry aggregation module (128), which is configured to carry out journal entry aggregation in accordance with embodiments of the present invention. Although such a journal entry aggregation module (128) is depicted as a component of a journal module (126), readers of skill in the art will recognize that such a module may also be implemented as a standalone module of computer program instructions, separate from the journal module (128). The journal entry aggregation module (128) may carry out journal entry aggregation by: inserting, in a journal modification table (132), a plurality of database entry modifications, where each database entry is associated with a relative record number (RRN); and, for each relative record number, the journal entry aggregation module aggregates, in the journal modification table, a plurality of the modifications into a single modification.

A relative record number, as the term is used here, refers to a unique identifier of a record of a table of a database. The relative record number may be stored in the database tables itself along with the record associated with the relative record number. Alternatively, the relative record numbers may be stored in other tables and keyed in such a way so as to be associated with a particular record of a table of the database. In yet another embodiment, the relative record number may be implicit rather than an explicit value stored in the table. In some embodiments, the identifier is an integer which may be thought of as a row number of a table having rows and columns. The identifier may unique identify the record (row) which is associated with the identifier. Although two tables in the database may include a relative record number of 1, the relative record number coupled with the table identifier (name) may be utilized to uniquely identify the record in a particular table.

The journal entry aggregation module (128) may insert each of the modifications to the database from a start point to an end point and then aggregate modifications according to relative record number. Consider, for example, twenty modifications in a journal modification table, each of which is a modification of a relative record number '4'. Replaying a journal with such a set of modifications will result in each of the twenty modifications being carried out in order. Rather than carrying out twenty separate modifications to a single record, the journal entry aggregation module (128) is configured to aggregate all twenty of the modifications to relative record number '4' into a single modification stored in journal modification table (132). When applying the journal modification table (132), rather than twenty distinct modifications being carried out to a single relative record number, only one operation will be carried out.

Further, in some embodiments, the journal entry aggregation module (128) may be configured to remove, for each relative record number having an aggregated modification, all other modifications for that relative record number. Continuing with the example set forth above of relative record number '4' having twenty modifications, the journal entry aggregation module (128) may remove all twenty distinct operations, leaving only the aggregated modification for relative record number '4.' In this way, the journal modification table may be far smaller in file size than the journal (130) which requires each and every modification be stored. Thus, when the journal (130) is complete (all database entry modifications from the start to end point are tracked in the journal), the journal (130) may be moved to long term storage (136) while the journal modification table (132)—at least in some embodiments—may remain in RAM (168) due to the journal modification table's much smaller file size.

Also stored in RAM (168) is an operating system (154). Operating systems useful for aggregating database entry modifications for replay of database changes according to embodiments of the present invention include UNIX™, Linux™, Microsoft XP™, AIX™, IBM's i5/OS™, and others as will occur to those of skill in the art. The operating system (154), journal module (126), journal entry aggregation module (128), journal (130), and journal modification table (132) in the example of FIG. 1 are shown in RAM (168), but many components of such software typically are stored in non-volatile memory also, such as, for example, on a disk drive (170).

The computer (152) of FIG. 1 also includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for aggregating database entry modifications for replay of database changes according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for aggregating database entry modifications for replay of database changes according to embodiments of the present invention include modems for wired dial-up communications, Ethernet (IEEE 802.3) adapters for wired data communications, and 802.11 adapters for wireless data communications.

The arrangement of computers, database, and storage devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
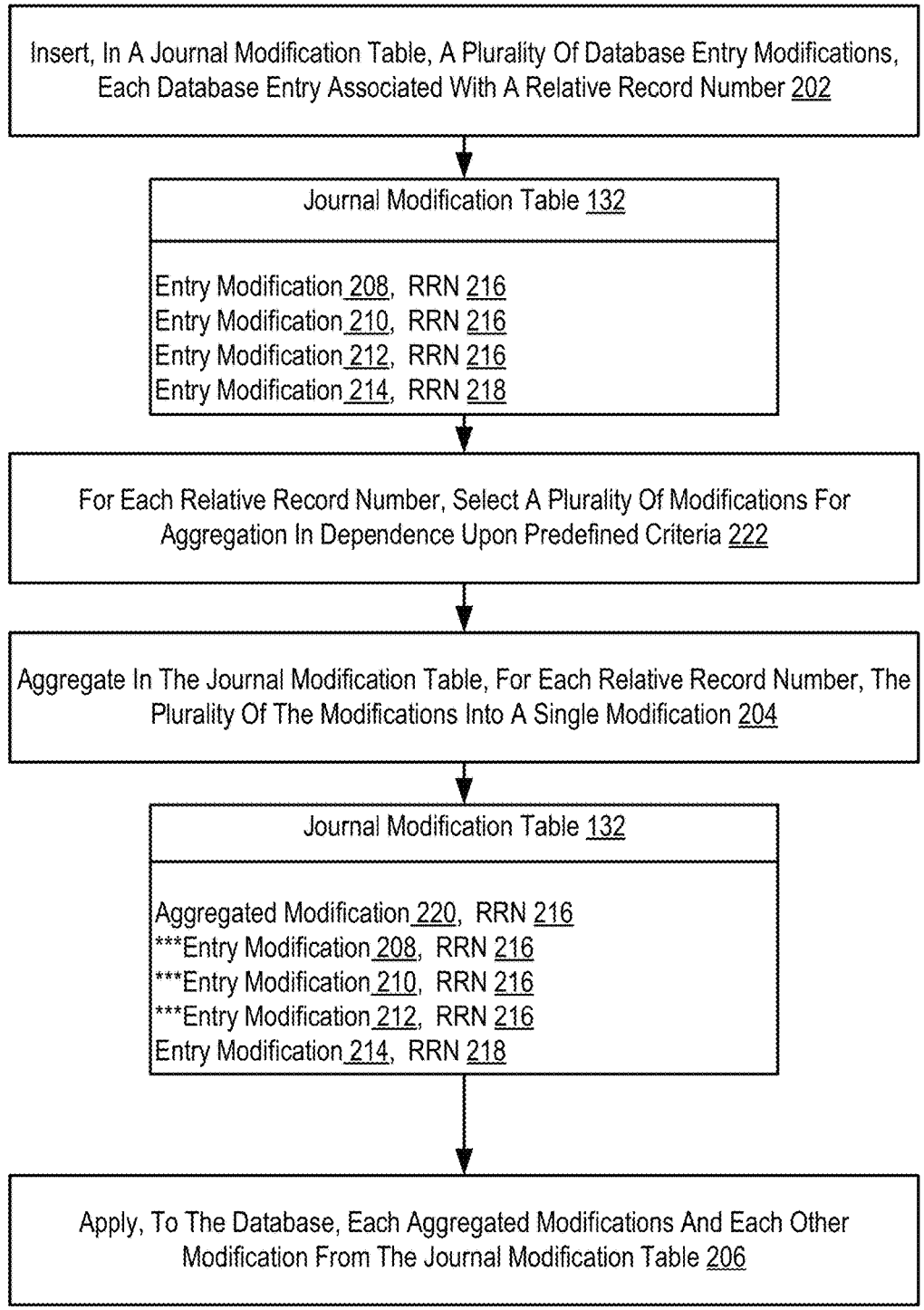
FIG. 2 sets forth a flow chart illustrating an exemplary method for aggregating database entry modifications for replay of database changes according to embodiments of the present invention.

For further explanation, FIG. 2 sets forth a flow chart illustrating an exemplary method for aggregating database entry modifications for replay of database changes according to embodiments of the present invention. The method of FIG. 2, as well as the methods of FIGS. 3-5, may be carried out by a journal entry aggregation module similar to that described above with respect to FIG. 1. To that end, from time to time, the method steps set forth in FIGS. 2-5 are described as being carried out by such a module. The method of FIG. 2 includes inserting (202), in a journal modification table, a plurality of database entry modifications (208, 210, 212, 214). There are four entry modifications (208, 210, 212, 214) depicted in the journal modification table of FIG. 2 for clarity of explanation. Readers of skill in the art will recognize that such journal modification table may include many thousands or millions of such modifications depending on the activity of applications modifying database entries and the amount of modifications performed from the start to end point of the journal.

In the method of FIG. 2, each database entry is associated with a relative record number. In this example, three of the example entry modifications have the same relative record number (216) while one has another relative record number (218).

Inserting (202) a plurality of database entry modifications may be carried out in a variety of ways at a variety of points in time. In some embodiments, inserting a database entry modification into a journal modification table may include storing a description of the modification including the relative record number, type of modification, values of the modification, and so on into predefined columns of the journal modification table.

In some embodiments, the plurality of database entry modifications (208, 210, 212, 214) may be inserted into the journal modification table (132) in parallel with tracking the plurality of database entry modifications in a journal. That is, a module (such as the journal module of FIG. 1) may track each database modification occurring between a start point and end point and, while maintaining the journal with each of these modifications, also insert (202) the modifications into the journal modification table (132). The journal modification table (132), in such an embodiment, may be instantiated, empty, when a journal is first created and filled between the start and end points of the journal and along with the journal.

In other embodiments, the plurality of database entry modifications (208, 210, 212, 214) may be inserted into the journal modification table (132) responsive to parsing a journal that includes the plurality of database entry modifications. That is, the journal modification table may be created empty after a journal has already been filled (after the end point of the journal). Then, immediately prior to, in parallel with, or immediately after the journal is saved to storage for later retrieval, the journal modification table may be filled with the database modifications captured in the journal. In this way, the larger journal may be saved off to long term storage while the journal modification table may be kept in main memory and entries within the journal may be aggregated. Such aggregation, as described below in more detail, may result in a journal modification table that is many times smaller in file size than the journal itself.

The method of FIG. 2 also includes, selecting (222), for each relative record number in dependence upon predefined criteria, a plurality of modifications for aggregation. Such predefined criteria may include a maximum number of modifications to aggregate, a minimum number of modifications to aggregate, a range of modifications to aggregate based on time of the modifications, and so on as will occur to readers of skill in the art.

The method of FIG. 2 also includes aggregating (204) in the journal modification table (132), for each relative record number, a plurality of the modifications into a single modification. Aggregating modifications of a relative record number into a single modification may be carried out by identifying a last modification of each field of the record and creating a single operation to effect each of the identified modifications. Consider the three following pseudo-SQL (Structured Query Language) operations:

a. UPDATE CustTable SET Product = 'C'
 i. WHERE Customer = 'Betty' at RRN = 3;
b. UPDATE CustTable SET Customer = 'Lisa'
 i. WHERE Customer = 'Betty' at RRN = 3;
c. UPDATE CustTable SET Number = '4' WHERE Customer =
 i. 'Lisa' at RRN = 3.

In the first operation, a table called 'CustTable' is updated at relative record number '3' to include in the Product field a value of 'C' and in the customer field a value of 'Betty'. In the second operation the same record is updated to set the Customer field to a value of 'Lisa' rather than 'Betty'. Finally, in the third operation, the same record is updated to set the Number field to a value of '4'. To aggregate these modifications to the same relative record number, a journal entry aggregation module may identify the last modification of each field of the record associated with the relative record number. Here, the last modification to the Customer field is to set the value to 'Lisa,' the last modification of the Number field is to set the value to '4,' the last modification of the Product field is to set the value to 'C.' Readers of skill in the art will recognize that in some embodiments, the 'at RRN=' portions of the above pseudo SQL instruction need not be explicitly included. The SQL manager may resolve the RRN instead.

After identifying the last modification to each field the journal entry aggregation module may create a single operation to effect the modifications. In the above example, the journal entry aggregation module may create the following example pseudo-SQL operation:

d. MERGE UPDATE CustTable Widget = 'C', Customer ='Lisa',
 Number = '4' at RRN = 3.

In the example of FIG. 2, each of the entry modifications (208, 210, 212) associated with the same relative record number (216) are aggregated into a single entry modification (220) in the journal modification table (132). Although the entry modifications (208, 210, 212) comprising the single aggregated modification (220) for relative record number (216) remain in the journal modification table (132) in the example of FIG. 2, readers will recognize that in some embodiments (described below with respect to FIG. 4) such entry modifications (208, 210, 212) need not be retained in the journal modification table (132).

At a later time, a journal module or other module may replay database changes represented in the journal modification table by applying (206) to the database each of the aggregated modifications and each of the other modifications in the journal modification table. When applying such changes, only the single aggregated entry modification (220) for relative record number (216) need be applied rather than the three separate entry modifications (208, 210, 212) originally inserted in the journal modification table (132).

Figure 3:
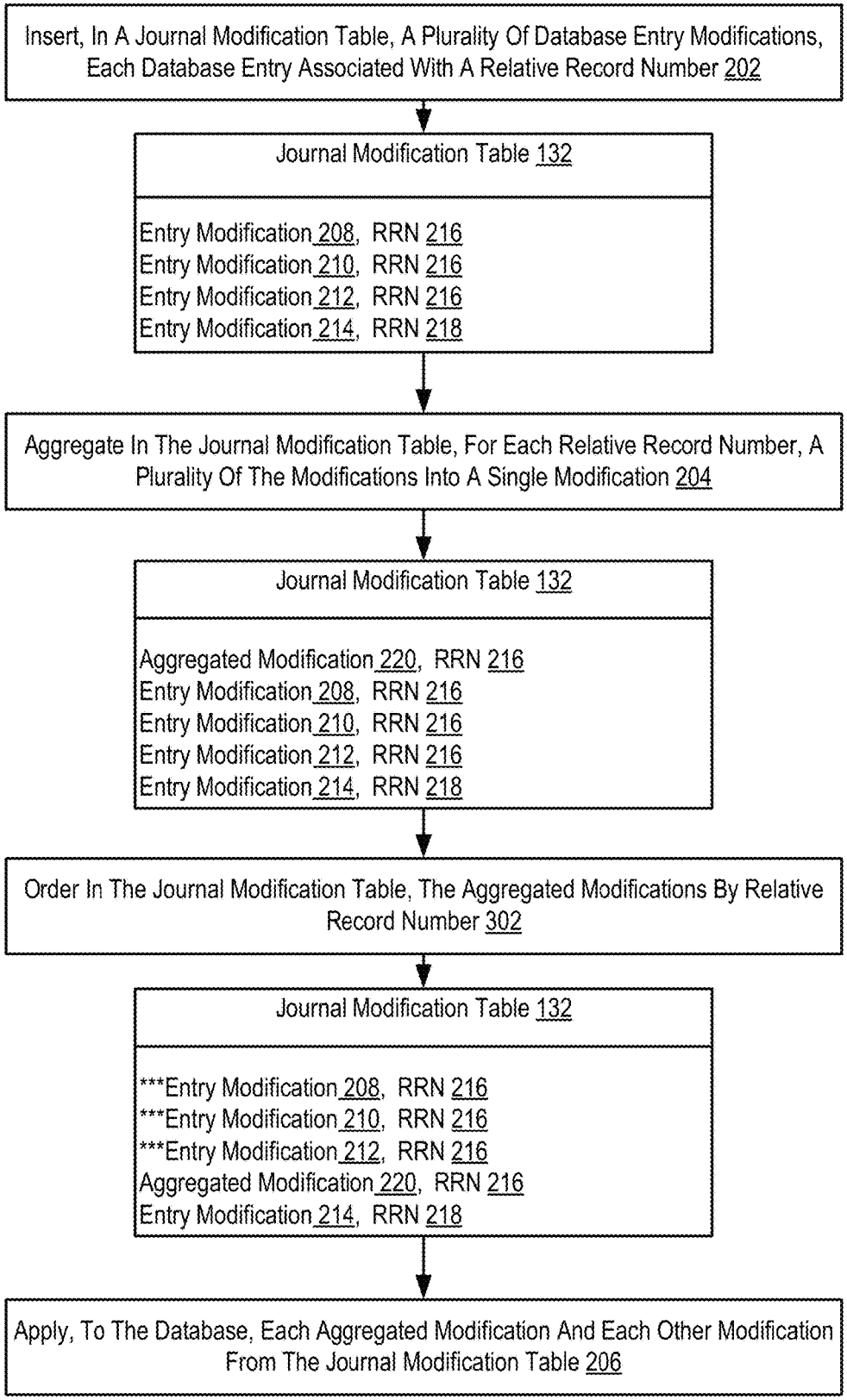
FIG. 3 sets forth a flow chart illustrating a further exemplary method for aggregating database entry modifications for replay of database changes according to embodiments of the present invention.

For further explanation, FIG. 3 sets forth a flow chart illustrating a further exemplary method for aggregating database entry modifications for replay of database changes according to embodiments of the present invention. The method of FIG. 3 is similar to the method of FIG. 2, including as it does inserting (202), in a journal modification table (132), a plurality of database entry modifications (208, 210, 212, 214), where each database entry is associated with a relative record number (216, 218); aggregating (204) in the journal modification table, for each relative record number, a plurality of modifications into a single modification; and applying (206), to the database each of the aggregated modifications and each of the other modifications from the journal modification table (132).

The method of FIG. 3 differs from the method of FIG. 2, however, in that the method of FIG. 3 also includes ordering (302), in the journal modification table (132), the modifications by relative record number. Databases may be very large and include many tables. As such, changes to a database may span many terabytes of information. Consider, for example, that relative record number one and relative record number one million may both have modifications tracked and inserted in the journal modification table. In instances in which such modifications are interleaved (a change to RRN 1, followed by a change to RRN 1000000, followed by a change to RRN 3, followed by a change to RRN 1000003, for example), the tables containing such records must be brought into main memory and paged out disk for each of the modifications. If a page contains RRN 1 and RRN 3, while another page includes RRN 1000000 and 1000003, prior art journal replay would require the following order of operations:

- e. the page containing RRN 1 and RRN 3 is brought into main memory;
- f. the modification to RRN 1 is carried out;
- g. the page containing RRN 1 and RRN 3 is paged out to disk;
- h. the page containing RRN 1000000 and 1000003 is brought into main memory;
- i. the modification to RRN 1000000 is carried out;
- j. the page containing RRN 1000000 and 1000003 is paged out to disk;
- k. the page containing RRN 1 and RRN 3 is brought back into main memory;
- l. the modification to RRN 3 is carried out;
- m. the page containing RRN 1 and RRN 3 is again paged out to disk;
- n. the page containing RRN 1000000 and 1000003 is brought back into main memory;
- o. the modification to RRN 1000003 is carried out; and
- p. the page containing RRN 1000000 and 1000003 is again paged out to disk.

In this example, each of the memory pages is paged out to disk only twice.

The modifications in the example journal modification table (132) of FIG. 3, by contrast, are ordered by relative record number. The order may be ascending or descending. Continuing with the example above, rather than the modifications to RRN 1 and RRN 3 being interleaved with modifications of RRN 1000000 and RRN 1000003, the journal modification table may order the modifications in ascending order. In such an embodiment, when applying the modifications in the journal modification table, the following operations may be carried out:

- q. the page containing RRN 1 and RRN 3 is brought into main memory;
- r. the modification to RRN 1 is carried out;
- s. the modification to RRN 3 is carried out;
- t. the page containing RRN 1 and RRN 3 is paged out to disk;
- u. the page containing RRN 1000000 and 1000003 is brought into main memory;
- v. the modification to RRN 1000000 is carried out;
- w. the modification to RRN 1000003 is carried out; and
- x. the page containing RRN 1000000 and 1000003 is paged out to disk.

In this example, each of the two pages is brought into main memory only once and paged out to disk only once. By ordering the modifications (aggregated and otherwise) in the journal modification table (132) by relative record number, the probability that paging out to disk decreases relative to typical journal processing increases. In fact, the likelihood that a single page of database table memory is paged out to disk more than once during an application process decreases significantly relative to typical journal processing.

Figure 4:
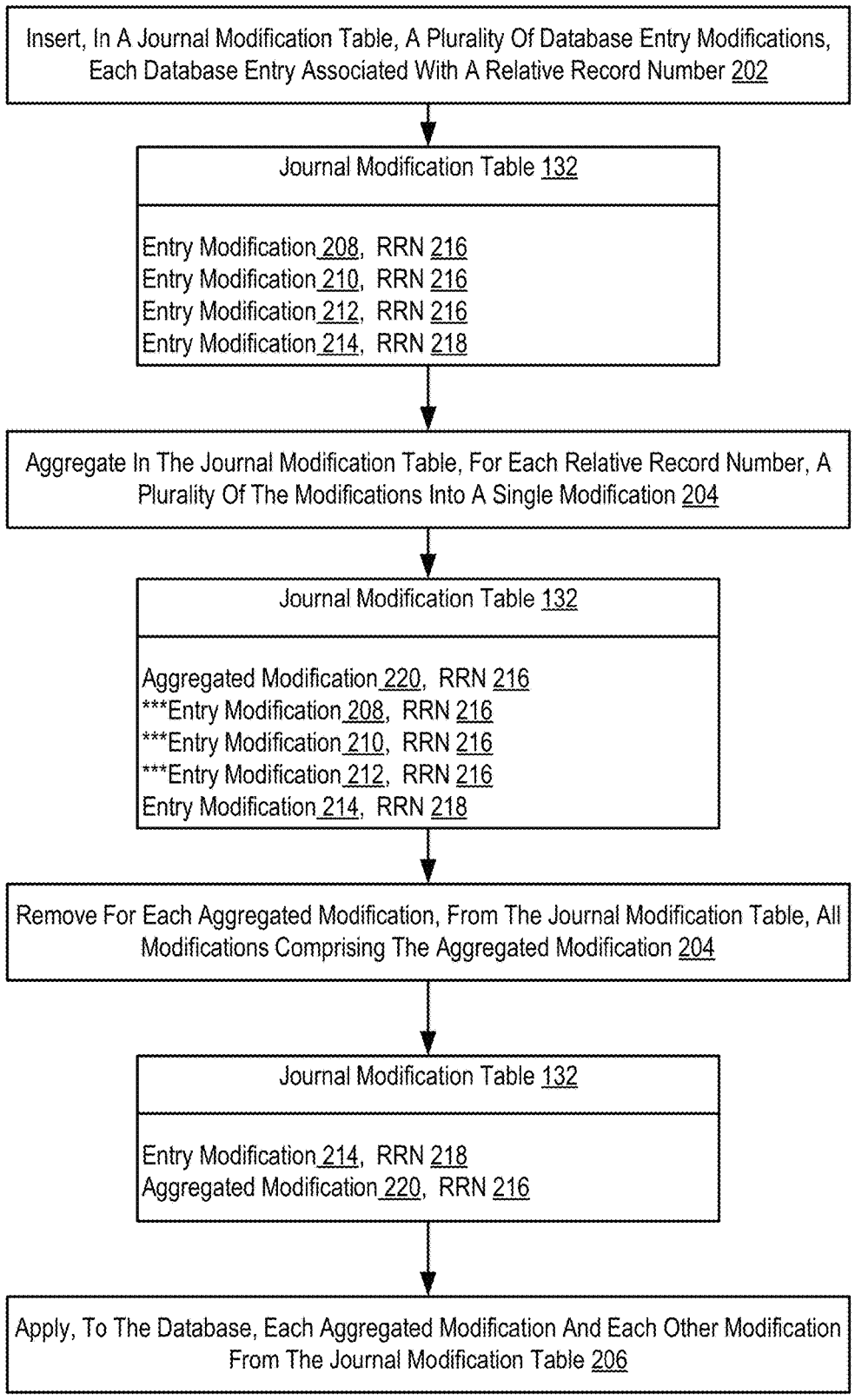
FIG. 4 sets forth a flow chart illustrating a further exemplary method for aggregating database entry modifications for replay of database changes according to embodiments of the present invention.

For further explanation, FIG. 4 sets forth a flow chart illustrating a further exemplary method for aggregating database entry modifications for replay of database changes according to embodiments of the present invention. The method of FIG. 4 is similar to the method of FIG. 2, including as it does inserting (202), in a journal modification table (132), a plurality of database entry modifications (208, 210, 212, 214), where each database entry is associated with a relative record number (216, 218); aggregating (204) in the journal modification table, for each relative record number, a plurality of the modifications into a single modification; and applying (206), to the database each of the aggregated modifications and each of the other modifications from the journal modification table (132).

The method of FIG. 4 differs from the method of FIG. 2, however, in that the method of FIG. 4 also includes removing (204) from the journal modification table (132), for each aggregated modification, all modifications comprising the aggregated modification. As mentioned above, in some embodiments, after aggregating the modifications for an RRN into a single operation, the journal entry aggregation module may maintain each of the other modifications that comprise the aggregated modification. Maintaining the other modifications provides the ability to rollback modifications in the database from any point between the start and end point and in reverse order. In some embodiments, however, the journal entry aggregation module may be configured to remove any of the modifications that comprise aggregated modifications. While rollback, in such an embodiment, will not be possible using the journal modification table at the granularity of each modification that comprises an aggregated modification, the number of entries, and thus file size, of the journal modification table (132) may be greatly reduced.

Figure 5:
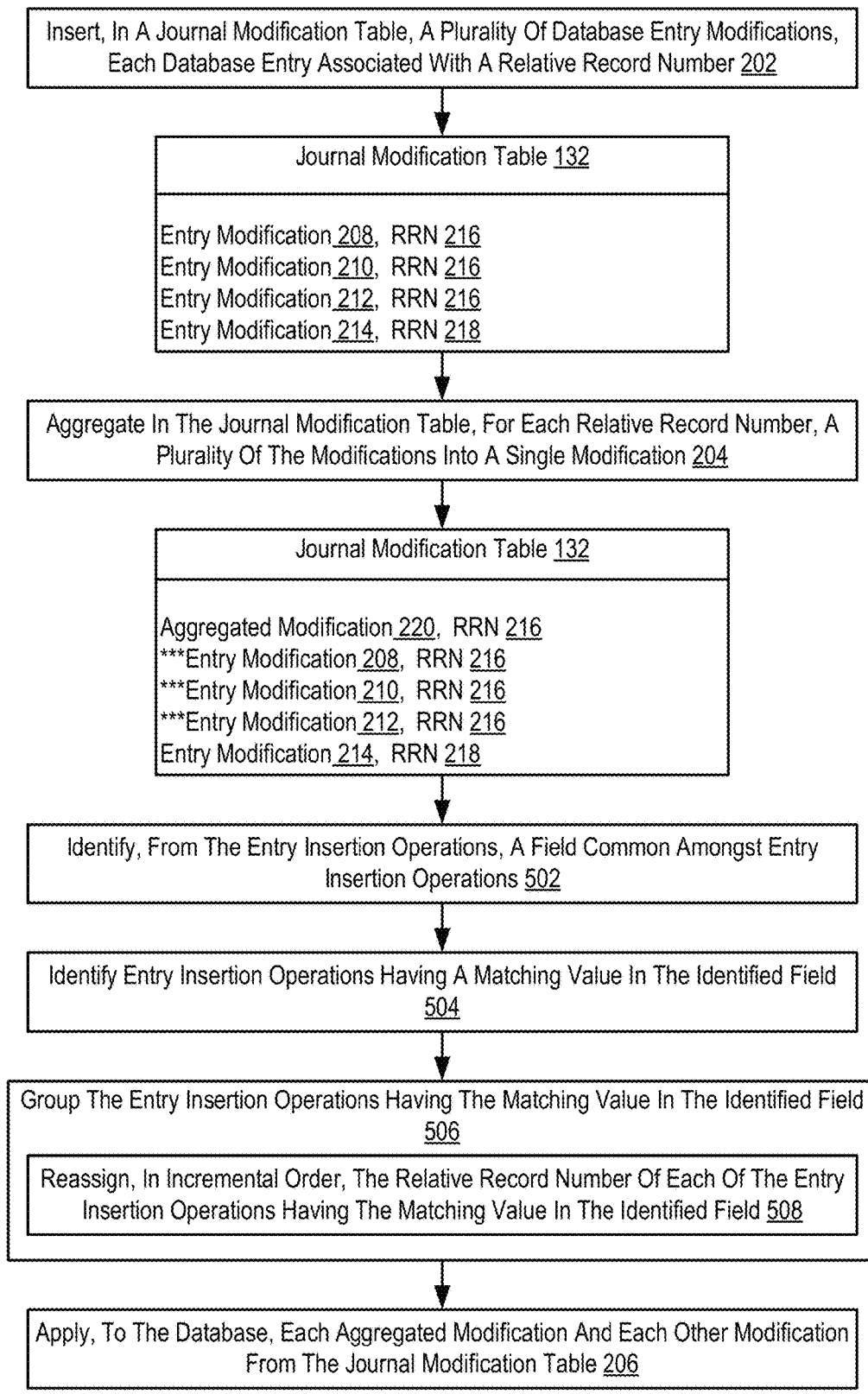
FIG. 5 sets forth a flow chart illustrating a further exemplary method for aggregating database entry modifications for replay of database changes according to embodiments of the present invention.

For further explanation, FIG. 5 sets forth a flow chart illustrating a further exemplary method for aggregating database entry modifications for replay of database changes according to embodiments of the present invention. The method of FIG. 5 is similar to the method of FIG. 2, including as it does inserting (202), in a journal modification table (132), a plurality of database entry modifications (208, 210, 212, 214), where each database entry is associated with a relative record number (216, 218); aggregating (204) in the journal modification table, for each relative record number, a plurality of the modifications into a single modification; and applying (206), to the database each of the aggregated modifications and each of the other modifications from the journal modification table (132).

The method of FIG. 5 differs from the method of FIG. 2, however, in the method of FIG. 2, the plurality of database entry modifications (208, 210, 212, 214) includes a plurality of entry insertion operations. An entry insertion operation is an operation in which a record is created in the database. When a record is created in the database, an RRN is assigned to the record in the database.

The method of FIG. 5 also includes identifying (502), from the entry insertion operations, a field common amongst the entry insertion operations. Identifying a field common amongst a plurality of entry insertion operations may also include identifying an 'importance' or 'weight' of the common field relative to other common fields. The importance of a field, as a described below in greater detail, may provide a foundation to reduce paging when applying the entry insertion operations during a replay of the journal modification table. Such importance or weight of a field may be identified in a variety of manners including, for example, by a user specifying to the journal entry aggregation module the importance of a particular field (a column), by the journal entry aggregation module inferring the importance of a field based on the number of times a value in the field (regardless of RRN) is modified or inserted, by the journal entry aggregation module inferring the importance of a field based on the similarity of values in the field amongst the entry insertion operations, by the journal entry aggregation module inferring importance of a field by the use of that field in database reports or database queries, by the journal entry aggregation module inferring importance of a field based on key columns or indexed columns, and in other ways as will occur to readers of skill in the art. Consider, as an example of the following example pseudo-SQL entry insertion operations:

y. Insert Values (MN, 123, $12.75, Low) at RRN 100
    z. Insert Values (WI, 234, $22.76, High) at RRN 101
    aa. Insert Values (MN, 567, $13.74, Med) at RRN 102
    bb. Insert Values (WI, 456, $123.76, Med) at RRN 103
    cc. Insert Values (WI, 789, $2.76, Low) at RRN 104
    dd. Insert Values (MN, 111, $1.62, Low) at RRN 105

In this example, the journal entry aggregation module may infer that the 'State' field is a common field amongst the insertion values and that field has a higher level of importance than other fields based on identifying the 'State' field as a common grouping column for reports and queries.

Once such common fields are identified, the method of FIG. 5 continues by identifying (504) entry insertion operations having a matching value in the identified field and grouping (506) the entry insertion operations having the matching value in the identified field. Grouping (506) such entry insertion operations in the journal modification table (132) may be carried out by reassigning (508), in incremental order, the relative record number of each of the entry insertion operations having the matching value in the identified field. Continuing with the example above, the journal entry aggregation module may group, by RRN reassignment, the example entry insertion operations as follows:

ee. Insert Values (MN, 123, $12.75, Low) at RRN 100
    ff. Insert Values (MN, 567, $13.74, Med) at RRN 101
    gg. Insert Values (MN, 111, $1.62, Low) at RRN 102
    hh. Insert Values (WI, 234, $22.76, High) at RRN 103
    ii. Insert Values (WI, 456, $123.76, Med) at RRN 104
    jj. Insert Values (WI, 789, $2.76, Low) at RRN 105

In this way, after replaying the above entry insertion operations, the database contains records having matching values grouped together in ascending RRN order. This ordering of database entries may increase efficiency of access to such records for database queries, reports, and the like and may also reduce paging to disk given that records with matching values in highly important fields are accessed together more often than records without such matching values. Readers of skill in the art will recognize that in some instances an 'important' field amongst many insertion operations may not include matching values. In such an embodiment, the grouping of these entry insertion operations may be carried out by sorting the algorithms based on the values of the common field.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of aggregating database entry modifications for replay of database changes, the method comprising:
    inserting, by at least one computer, in a journal modification table, a plurality of database entry modifications, each database entry associated with a relative record number, the plurality of database entry modifications comprising a plurality of entry insertion operations;
    aggregating, by the at least one computer, in the journal modification table, two or more of the database entry modifications corresponding to a same relative record number by, for each relative record number, identifying, from one or more modifications of each field of a database entry, a last modification of more than one field of the database entry associated with the same relative record number and creating, for each relative record number, a single modification operation to effect each of the identified last modifications of the fields of the database entry;
    identifying, by the at least one computer, from the entry insertion operations, a field common amongst the entry insertion operations;
    identifying, by the at least one computer, entry insertion operations having a matching value in the identified field; and
    grouping, by the at least one computer, the entry insertion operations having the matching value in the identified field by reassigning, in incremental order, the relative record number of each of the entry insertion operations having the matching value in the identified field.

2. The method of claim 1 further comprising ordering, in the journal modification table, the database entry modifications by relative record number.

3. The method of claim 1 further comprising removing from the journal modification table, for each aggregated database entry modification, all database entry modifications comprising the aggregated database entry modification.

4. The method of claim 1 wherein inserting a plurality of database entry modifications in the journal modification table is carried out in parallel with tracking the plurality of database entry modifications in a journal.

5. The method of claim 1 wherein inserting a plurality of database entry modifications in the journal modification table is carried out responsive to parsing a journal that includes the plurality of database entry modifications.

6. The method of claim 1 further comprising prior to aggregating the plurality of database entry modifications into a single modification operation, selecting the plurality of database entry modifications in dependence upon predefined criteria.

* * * * *